(12) United States Patent
Sowards (10) Patent No.: US 6,405,703 B1
(45) Date of Patent: Jun. 18, 2002

(54) INTERNAL COMBUSTION ENGINE

(76) Inventor: Brian Sowards, 119 Sunhaven La., Mooresville, NC (US) 28117

( * ) Notice: Subject to any disclaimer, the term of this patent is extended or adjusted under 35 U.S.C. 154(b) by 0 days.

(21) Appl. No.: 09/896,063

(22) Filed: Jun. 29, 2001

(51) Int. Cl.[7] .................................................. F02B 53/04
(52) U.S. Cl. ........................................ 123/221; 123/239
(58) Field of Search ................................ 123/221, 239, 123/241

(56) References Cited

U.S. PATENT DOCUMENTS

| | | | |
|---|---|---|---|
| 2,474,685 A | | 6/1949 | McCollum |
| 2,486,990 A | | 11/1949 | Sharpe |
| 2,509,359 A | | 5/1950 | Margolis |
| 2,638,745 A | | 5/1953 | Nathan |
| 2,731,795 A | | 1/1956 | Bodine, Jr. |
| 2,852,914 A | | 9/1958 | Robin et al. |
| 3,844,116 A | | 10/1974 | Matto |
| 3,869,864 A | | 3/1975 | Bunn |
| 3,886,908 A | * | 6/1975 | Ruzic .......................... 123/8.31 |
| 4,008,693 A | * | 2/1977 | Rea et al. .................... 123/239 |
| 4,050,239 A | | 9/1977 | Kappler et al. |
| 4,175,380 A | | 11/1979 | Baycura |
| 4,203,283 A | | 5/1980 | Weiler |
| 4,294,068 A | | 10/1981 | Klees |
| 4,304,095 A | | 12/1981 | Rasanen |
| 4,446,829 A | * | 5/1984 | Yeager ........................ 123/244 |
| 4,463,551 A | | 8/1984 | Morris |
| 4,499,735 A | | 2/1985 | Moore et al. |
| 4,815,294 A | | 3/1989 | David |
| 5,003,766 A | | 4/1991 | Paul |
| 5,253,472 A | | 10/1993 | Dev |
| 5,271,364 A | * | 12/1993 | Snyder ........................ 123/241 |
| 5,282,356 A | | 2/1994 | Abell |
| 5,341,636 A | | 8/1994 | Paul |
| 5,408,824 A | | 4/1995 | Schlote |
| 5,454,222 A | | 10/1995 | Dev |
| 5,560,196 A | | 10/1996 | Schlote |
| 5,636,509 A | | 6/1997 | Abell |
| 5,660,038 A | | 8/1997 | Stone |
| 5,709,076 A | | 1/1998 | Lawlor |
| 5,746,048 A | | 5/1998 | Shah |
| 5,749,217 A | | 5/1998 | Etheridge |
| 5,839,283 A | | 11/1998 | Dobbeling |
| 5,983,624 A | | 11/1999 | Anderson |
| 6,047,540 A | | 4/2000 | Dev |

* cited by examiner

Primary Examiner—Hoang Nguyen
(74) Attorney, Agent, or Firm—Adams, Schwartz & Evans, P.A.

(57) ABSTRACT

A rotary internal combustion engine includes a housing within which is mounted for rotation at least one rotor. The rotor includes at least one flow conduit. The flow conduit defines a compression region having an inlet proximate to the rotation axis of the rotor and extending radially towards a periphery of the rotor. A mixture of air and fuel enters the flow conduit through the inlet and travels downstream through at least a portion of the compression region prior to combustion. A combustion region communicates with the compression region and is proximate to the periphery of the rotor. The air/fuel mixture flows from the compression region to the combustion region to undergo combustion in the combustion region. A power region communicates with the combustion region and includes an outlet proximate to the rotation axis of the rotor. The power region extends from the periphery of the rotor to the outlet. The compression region, combustion region, and power region of the flow conduit define a substantially U-shaped flow path along which the air/fuel mixture travels during engine operation.

24 Claims, 6 Drawing Sheets

INTERNAL COMBUSTION ENGINE

TECHNICAL FIELD AND BACKGROUND OF INVENTION

This invention relates to a rotary internal combustion engine. The engine includes an engine housing, and at least one rotor mounted for rotation within the housing. The rotor is adapted for rotation about an axis and includes at least one generally U-shaped flow conduit cooperating with an air/fuel mixture and spark plug to effect combustion and power delivery to the rotor. The operation of the rotor in the present engine provides a more efficient and less costly alternative to conventional gas turbine engines.

In internal combustion engine markets below 1000 hp, conventional gas turbine engines are not competitive with piston engines (Diesel and Otto cycle) because of either engine cost or fuel efficiency. Gas turbine engines have compressors and power sections that are composed of stages, each stage having a moving element (rotor, impeller) and a stationary element (stator, nozzle, diffuser). These stages individually have a limited pressure capability. Current stage designs also have aerodynamic losses of several types, leakage losses and compressor surge problems. Therefore, the high combustion chamber pressures needed for good engine efficiency require multiple stages, which drives up engine cost. Recuperators or regenerators may be added to low pressure gas turbine engines to improve efficiency, but these devices also have a cost penalty.

The engine of the present invention is similar in many ways to conventional gas turbine engines, but has a compressor which can produce high (e.g. 170 psig) combustion chamber pressure in a single stage. There is no diffuser in the compressor, so surge is not possible. Compressor and power section efficiencies are nearly 100%. The power section is capable of dealing with this high pressure ratio with fewer stages. This invention has more torque at low engine speeds than conventional gas turbine engines. These attributes make the present engine competitive in cost and performance to piston engines.

SUMMARY OF THE INVENTION

Therefore, it is an object of the invention to provide an internal combustion engine which resembles a conventional gas turbine engine, but is competitive in both cost and performance to piston engines.

It is another object of the invention to provide an internal combustion engine which can produce high combustion chamber pressure in a single stage.

It is another object of the invention to provide an internal combustion engine which eliminates the possibility of surge by removing the diffuser in the compressor.

It is another object of the invention to provide an internal combustion engine which includes nearly 100% compressor and power section efficiencies.

It is another object of the invention to provide an internal combustion engine which has more torque at low engine speeds than conventional gas turbine engines.

It is another object of the invention to provide an internal combustion engine which achieves a total engine efficiency of around 35%.

These and other objects of the present invention are achieved in the preferred embodiments disclosed below by providing a rotary internal combustion engine. The engine includes a housing within which is mounted for rotation at least one rotor. The rotor is configured for rotation about an axis and includes at least one flow conduit. The flow conduit includes a compression region having an inlet proximate to the rotation axis of the rotor and extending radially towards a periphery of the rotor. A mixture of air and fuel enters the flow conduit through the inlet and travels downstream through at least a portion of the compression region prior to combustion. A combustion region communicates with the compression region and is proximate to the periphery of the rotor. The air/fuel mixture flows from the compression region to the combustion region to undergo combustion in the combustion region. A power region communicates with the combustion region and includes an outlet proximate to the rotation axis of the rotor. The power region extends from the periphery of the rotor to the outlet. The air/fuel mixture exits the flow conduit through the outlet after combustion. The compression region, combustion region, and power region of the flow conduit define a substantially U-shaped flow path along which the air/fuel mixture travels during engine operation.

According to another preferred embodiment of the invention, the combined volume of the combustion region and the power region is substantially greater than the volume of the compression region.

According to another preferred embodiment of the invention, the rotor includes at least two separate flow conduits.

According to another preferred embodiment of the invention, the rotor includes at least two interconnected flow conduits having respective compression, combustion, and power regions. The flow conduits are interconnected such that at least one of the compression regions is configured to deliver the air/fuel mixture simultaneously to at least two of the combustion regions.

According to another preferred embodiment of the invention, an inducer is located at the inlet of the compression region.

According to another preferred embodiment of the invention, a fuel injector is located proximate to the inlet of the compression region to introduce fuel into the flow conduit.

According to another preferred embodiment of the invention, a spark plug is located proximate to the inlet of the compression region to ignite the air/fuel mixture.

According to another preferred embodiment of the invention, the outlet of the power region includes an outlet nozzle through which the air/fuel mixture exits the flow conduit after combustion.

According to another preferred embodiment of the invention, the outlet nozzle is constructed such that the combusted air/fuel mixture exits the flow conduit as an exhaust jet. The exhaust jet has a velocity vector including a component vector at right angles to the rotation axis of the rotor.

According to another preferred embodiment of the invention, a turbine is arranged downstream of the outlet nozzle for actuation by the combusted air/fuel mixture exiting the flow conduit.

According to another preferred embodiment of the invention, the turbine is operatively connected to a rotor shaft at the rotation axis of the rotor.

According to another preferred embodiment of the invention, the turbine includes first and second portions. The first portion delivers power directly to the rotor shaft and the second portion delivers power to a second shaft.

According to another preferred embodiment of the invention, a vacuum pump is connected to an interior of the engine housing for maintaining air surrounding the rotor at a pressure below atmospheric pressure during engine operation.

According to another preferred embodiment of the invention, an exterior surface of the rotor is contoured to minimize aerodynamic drag.

According to another preferred embodiment of the invention, interior walls of the housing adjacent to the exterior surface of the rotor are contoured to minimize aerodynamic drag.

According to another preferred embodiment of the invention, the distance between the exterior surface of the rotor and the interior surface of the housing is at least two times the boundary layer thickness of the air between the rotor and the housing.

According to another preferred embodiment of the invention, the compression region of the flow conduit comprises means for diffusing the fuel into the air to form an air/fuel mixture to enhance combustion.

According to another preferred embodiment of the invention, the engine housing defines an entrance port for directing incoming air to the inlet of the compression region.

According to another preferred embodiment of the invention, the compression region defines a fuel delivery opening between the inlet and the combustion region.

In another embodiment, the invention is a rotor mounted for rotation within a housing of a rotary internal combustion engine. The rotor is configured for rotation about an axis and includes at least one flow conduit. The at least one flow conduit includes a compression region having an inlet proximate to the rotation axis of the rotor and extending radially towards a periphery of the rotor. A mixture of air and fuel enters the flow conduit through the inlet and travels downstream through at least a portion of the compression region prior to combustion. A combustion region communicates with the compression region and is proximate to the periphery of the rotor. The air/fuel mixture flows from the compression region to the combustion region to undergo combustion in the combustion region. A power region communicates with the combustion region and includes an outlet proximate to the rotation axis of the rotor. The power region extends from the periphery of the rotor to the outlet. The air/fuel mixture exits the flow conduit through the outlet after combustion. The compression region, combustion region, and power region of the flow conduit define a substantially U-shaped flow path along which the air/fuel mixture travels during engine operation.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
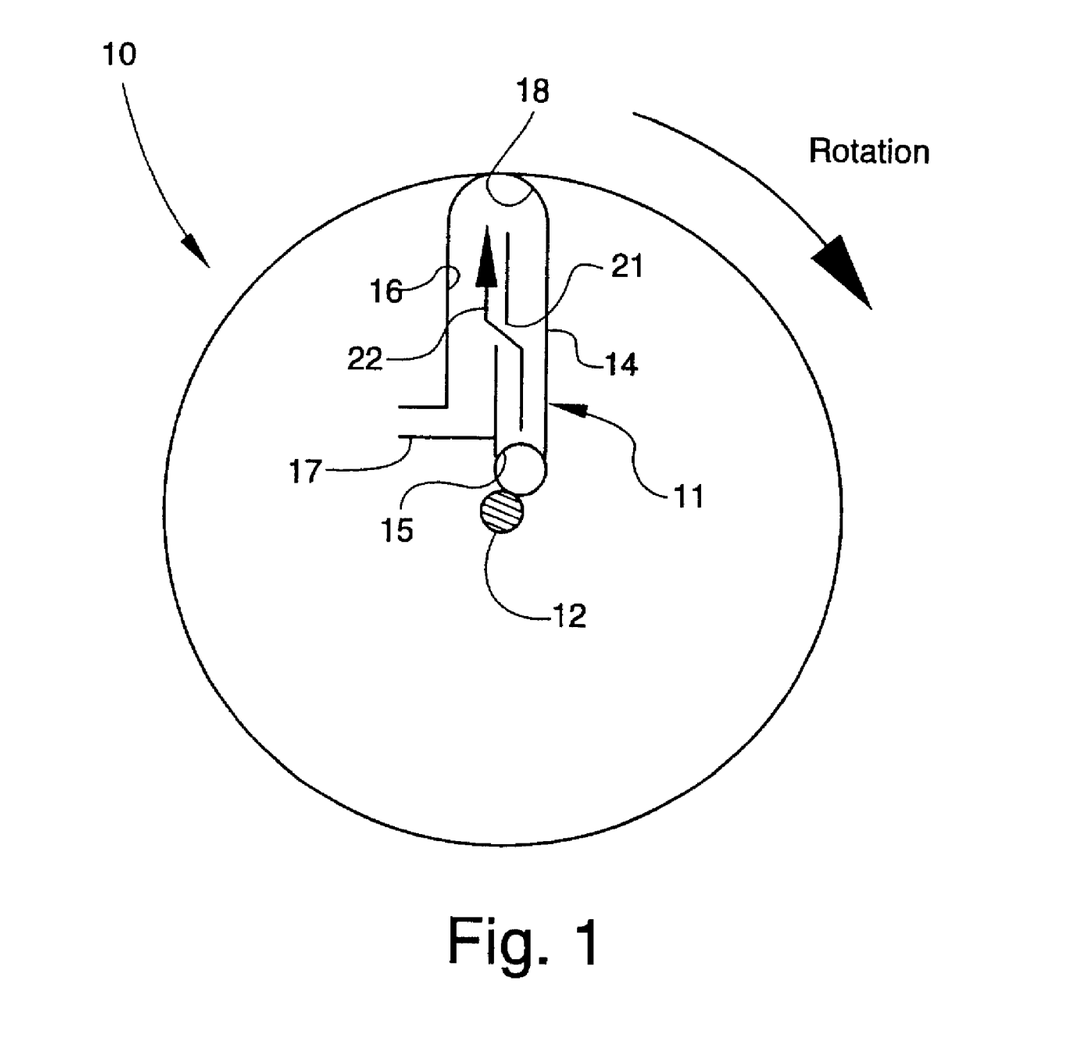
FIG. 1 is a section through a main rotor according to one preferred embodiment of the invention, and showing one of the internal U-tubes defining the compression, combustion, and power regions of the rotor.

Referring now specifically to the drawings, a rotor for an internal combustion engine according to the present invention is illustrated in FIG. 1 and shown generally at reference numeral 10. The rotor 10 includes one or more generally U-shaped radial tubes 11 formed in a spoke-like arrangement around a central axis of rotation 12. The rotor 10 is preferably balanced for smooth rotation. A representative U-tube 11 is shown in FIG. 1 and described further below.

The U-tube 11 includes a relatively long tube portion defining an air compression region 14 with an inlet 15 proximate to the rotation axis 12, and a shorter tube portion defining a power delivery region 16 having an outlet nozzle 17 proximate to the inlet 15. The tube portions are integrally formed together at a bend adjacent the outer periphery of the rotor 10. The bend forms a combustion region 18. Although the illustrated U-tube 11 has a uniform cross section along its entire length, the shape or area of the tube cross section may vary to enhance overall engine operation. Air enters the U-tube 11 through the inlet 15 of the compression region 14 near the rotor axis 12. Rotation of the rotor 10 creates a centrifugal force on the air columns in both the compression and power regions 14 and 16, thereby pressurizing the combustion region 18 at the bend of the U-tube 11. Pressurization of the combustion region 18 occurs whether air is flowing through the tube or is static. Pressure in the combustion region 18 is mainly dependent on rotor speed. Given a constant rotor speed, combustion region pressure will be nearly constant regardless of fuel flow rate. Because conventional gas turbines lose pressure in the combustion region as fuel flow reduces, the present engine will have improved efficiency and torque at low fuel flow rates.

Upon rotation of the rotor 10, air flows through the U-tube 11 as a result of the weight difference between air columns in the compression and power regions 14 and 16. This weight difference is caused by the different lengths of the tube portions and results in air pressure at the outlet nozzle 17 of the power region 16. Without combustion, air will enter the inlet 15 closest to the center of the rotor 10 and will flow out of the outlet nozzle 17 farther from the center. No engine power is produced without combustion. With combustion occurring in the combustion region 18, the hotter air in the power region 16 will have lower density than the cooler air in the compression region 14. Therefore, the weight of air in the power region 16 will be much less than the weight of the air in the compression region 14, resulting in sufficient pressure at the outlet nozzle 17 for engine power production. At a rotor periphery speed of 2600 ft/sec and nozzle tangential speed of 450 ft/sec, typical pressure in the combustion region is 170 psig with an outlet nozzle pressure of 38 psig. Since no diffuser is present, there cannot be surge in this compressor. The high pressure ratios in the present engine result in improved engine efficiency. Preferably, the engine achieves a total engine efficiency of around 35%. This is competitive with the performance of many piston engines.

A larger outlet nozzle 17 will produce more air flow through the U-tube 11, and hence more engine power. If airflow losses in the U-tube 11 are too high, the flow velocity can be reduced if the outlet nozzle 17 is made smaller. The direction of the exhaust gas jet flowing out of the nozzle 17 can have a portion flowing perpendicular to the axis 12 of rotor rotation in order to generate torque to rotate the rotor 10.

The present engine power cycle is similar to a conventional gas turbine engine. The compression region 14 of the U-tube 11 takes power from the rotor 10 during the compression process, while the power region 16 gives power back to the rotor 10 as the hot air travels through to the outlet nozzle 17. The power flow in given regions 14 or 16 is dependent upon air mass flow rate, radial start and finish positions and flow direction (toward or away from the rotor periphery). As air travels down the compression region 14 toward the rotor periphery, it is accelerated to the periphery speed of the rotor 10 (requiring power input from the rotor ), and as air travels back toward the rotor axis 12 through the power region 16 to the outlet nozzle 17, it is decelerated (giving power back to the rotor). With equal mass flows, the power requirements of the compression and power regions 14 and 16 will almost cancel each other. The small difference is made up by the power produced by the exhaust gas jet flowing through the outlet nozzle 17. Most of the energy generated in the outlet nozzle 17 is available as useful work delivered by the engine. Because subsonic air flow through a U-tube 11 has no leakage loss and very little aerodynamic loss, efficiencies of the compression and power regions 14 and 16 will be nearly 100%.

Figure 4:
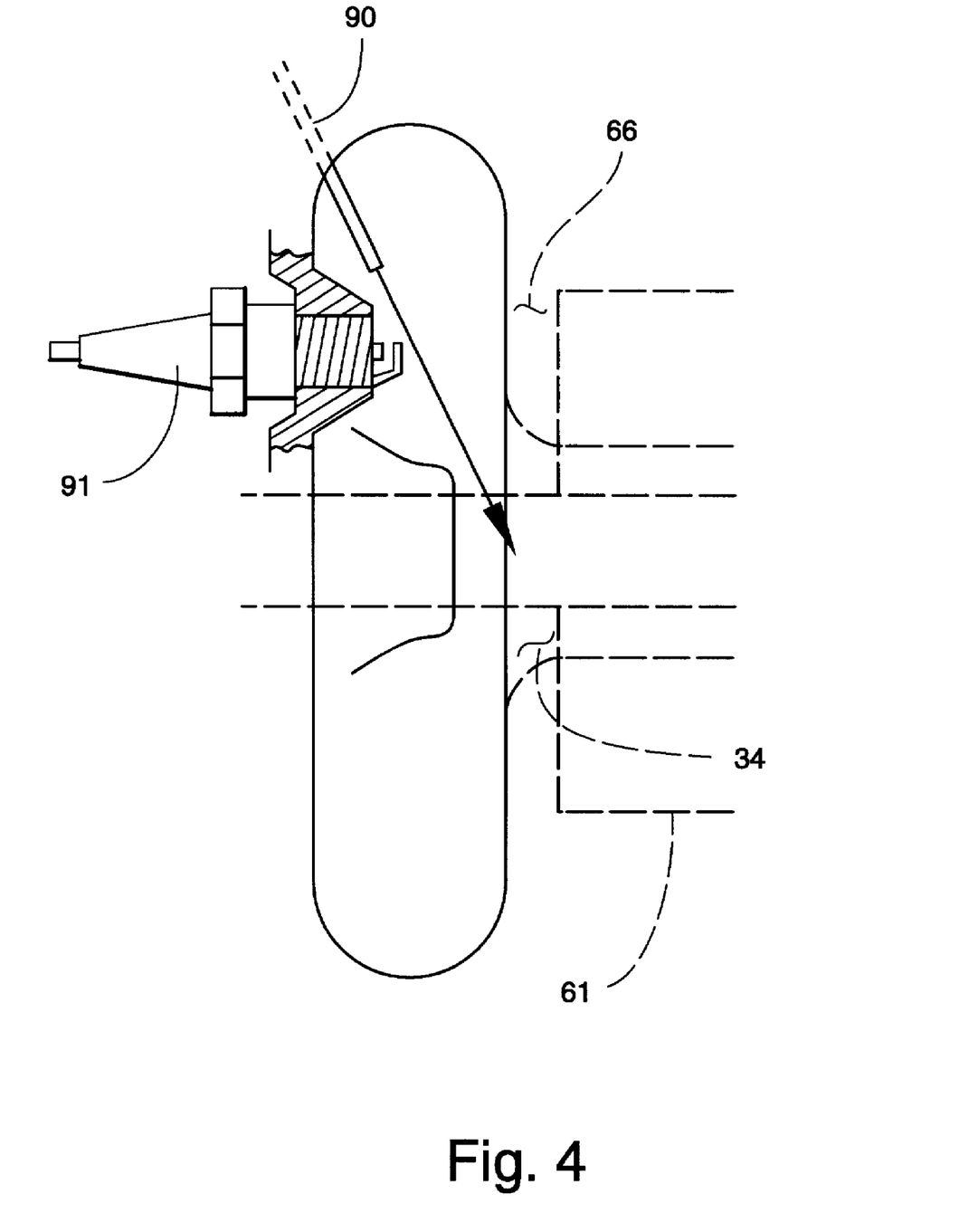
FIG. 4 is a partially broken out sectional view looking down the inlet of the engine of FIG. 3 in the direction of arrow A, and showing the spark plug and fuel injector.

Combustion occurs in a conventional manner utilizing a fuel injector and spark plug (such as shown in FIG. 4) located proximate to the inlet 15 of the compression region 14. During operation of the rotor 10, the air/fuel mixture travels down the compression region 14 to the combustion region 18. A fuel delivery opening 21 is preferably formed in the compression region 14 to enable further passage of the air/fuel mixture to the combustion region 18, as indicated by arrow 22. The location of the opening 21 is such that the air/fuel mixture going through the opening 21 is composed of a different ratio of air and fuel than the majority of the air/fuel mixture delivered downstream through the compression region 14 to the combustion region 18. Means (not shown) for diffusing the fuel into the air may be provided in the compression region 14 to further mix the fuel and air during passage to the combustion region 18 for enhanced combustion.

Figure 2:
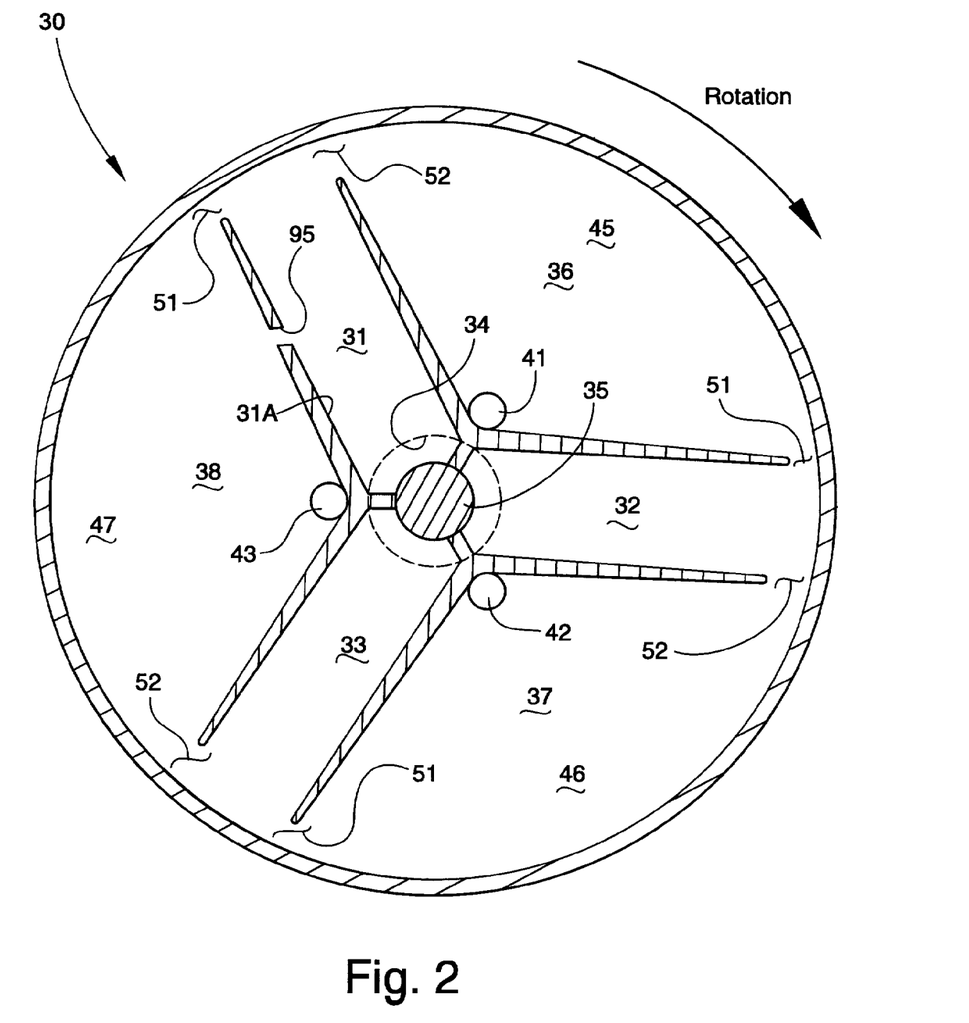
FIG. 2 is a section through an alternative embodiment of the main rotor, and showing several communicating internal regions.
Figure 3:
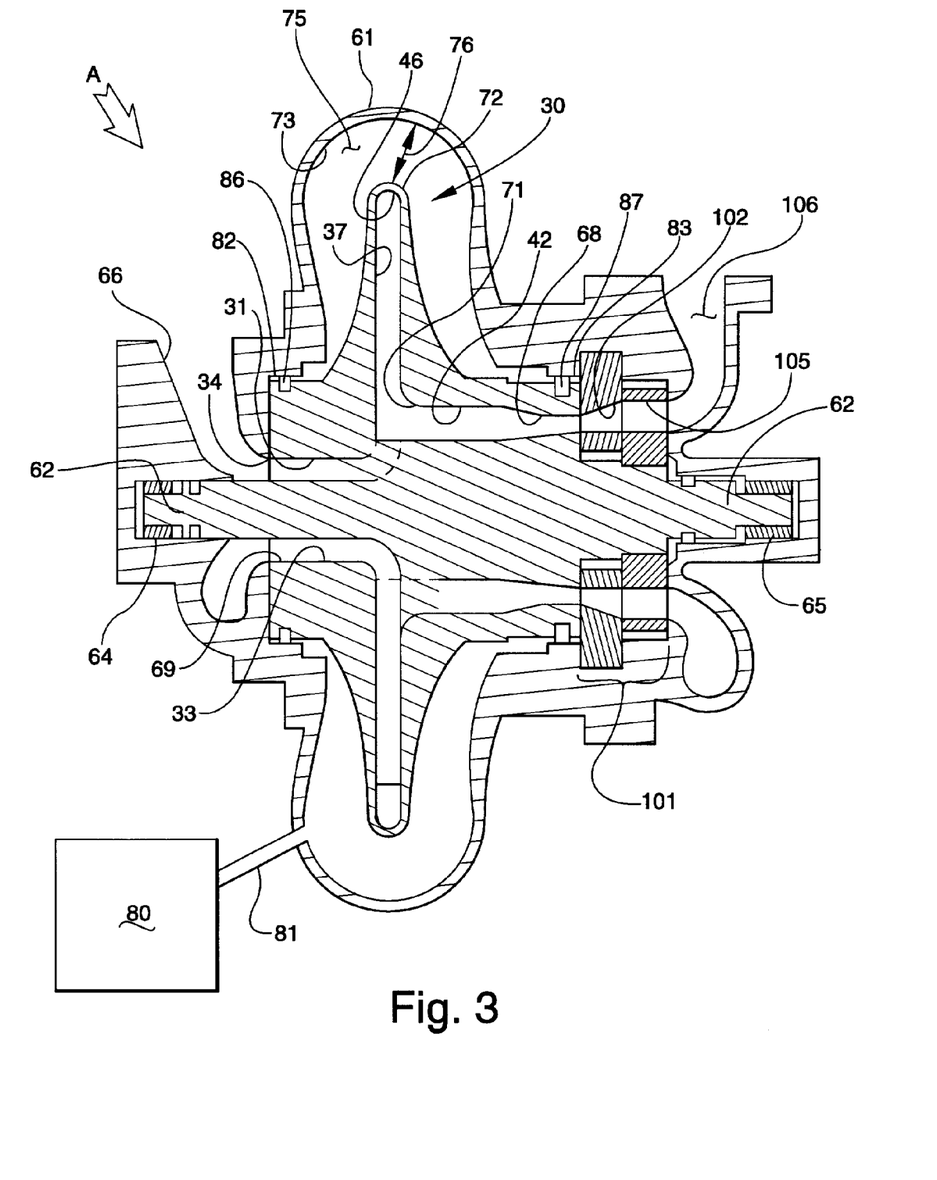
FIG. 3 is a longitudinal section through a complete engine, showing all major components in a configuration where the turbine section is connected to the main rotor shaft.

FIGS. 2 and 3 illustrate a further preferred embodiment of the present engine. In this embodiment, the rotor 30 includes three inlet tubes defining respective compression regions 31, 32, and 33 projecting radially from a common inlet 34 at the center axis 35 of the rotor 30. The spaces between adjacent tubes define power regions 36, 37, and 38 having outlets at 41, 42, and 43, respectively. Combustion regions 45, 46, and 47 are formed along the periphery of the rotor 30. Preferably, each combustion region 45,46, and 47 extends for nearly ⅓ of the rotor circumference. Because the nature of combustion makes the distinction between the combustion and power regions difficult to define, some overlapping of these regions may occur during operation of the rotor 30. Although the power regions 36, 37, and 38 serve a power producing function, they may also be locations for the final stages of the combustion process. Each of the power and combustion regions together are much larger than that of a compression region. Since combustion occurs in the regions 36, 37, 38 and 45, 46, 47, this will give the engine a large overall combustion chamber, which is desirable. Compressed air within each of the compression regions 31, 32, and 33 exits the compression region at the rotor periphery and has the option of going to either or both of the adjacent combustion regions 45, 46, and 47. The region walls have openings 51 and 52 at the rotor periphery allowing the required proportions of compressor airflow to enter combustion regions 45, 46, and 47.

FIG. 3 shows the location of the rotor 30 within an engine housing 61. Rotor 30 rotates on an axis defined by a shaft 62 formed as an integral part of the rotor 30. The shaft 62 is journaled within bearings 64 and 65 located in housing 61. As shown, the compression regions 31 and 33 of the rotor 30 receives air from the inlet 34. An inducer 69 is present to smooth the airflow into the compressor region 33, as it does in conventional radial flow dynamic compressors. An inlet duct 66 is formed in housing 61 to direct incoming airflow into the inlet 34 of the compression regions 31, 32, and 33. Combustion region 46 leads to the power region 37. The hot gas then flows through outlet 42 which leads to nozzle 68. The outlets 41, 42 and 43 may just be openings to respective nozzles 68 or may have some tubular length of their own, such as shown in FIG. 3. This gives room for a generous radius 71 and straightens the airflow for a non-turbulent entrance to nozzle 68.

In order to achieve high pressure in the combustion region, the periphery speed of the exterior surface 72 of the rotor 30 is preferably supersonic. To reduce air drag, the exterior surface 72 should define a smooth profile (no drag inducing protuberances) and have an aerodynamically correct surface finish. This also applies to the interior housing surface 73. Losses may be further reduced by the design shown in FIG. 3. The cavity 75 between the interior housing surface 73 and the rotor surface 72 has a critical spacing dimension 76 which is preferably larger than two times the boundary layer thickness of the air within the cavity 75. See the chapters on rotating disc flow in *Boundary Layer Theory*, Hermann Schlichting, McGraw-Hill, 1979. This disclosure is incorporate herein by reference.

With atmospheric pressure within the cavity 75, the viscous air drag on the surface 72 may still be high. The viscous drag can, however, be made acceptable if the cavity 75 is at a pressure less than atmospheric (e. g. 2 psia). A conventional vacuum pump 80, shown in FIG. 3, can easily achieve this pressure. Any suitable method may be used to drive the vacuum pump 80. A vacuum line 81 is shown, providing a conduit for the air to travel between the cavity 75 and vacuum pump 80, after which the air is expelled to atmosphere. Journal areas 82 and 83 define small clearances between the housing 61 and rotor 30 to inhibit the flow of air back into the cavity 75. Conventional non-contact seals 86 and 87 common to turbomachinery, may be placed in these journal areas between the rotor 30 and housing 61 to further minimize the passage of air into the cavity 75.

FIG. 4 illustrates one method to deliver fuel to the combustion regions in the engine. A fuel injector 90 and spark plug 91 are located proximate to the inlet duct 66 of the engine housing 61. The fuel injector 90 sprays fuel into the air inlet 34 near the axis of the rotor 30. The spark plug 91 is close to the fuel spray path and can ignite the fuel during engine start. The spark plug 91 is activated only long enough for the burning fuel to travel down the compressor regions 31, 32 and 33 and enter the combustion regions 45, 46 and 47. At that point, the spark plug is no longer activated and the flame is swept from the compression regions 31, 32 and 33 because the fuel and air travel through said compression regions at a speed that is faster than the fuel flame speed. But the flame is now established in the combustion regions 45, 46 and 47 where the air and fuel velocities are low enough to sustain normal continuous combustion.

Alternate fuel delivery routes are illustrated in one of the compression regions 31, 32, and 33 shown in FIG. 2. As the fuel travels through compression region 31 toward the rotor periphery, it will collect against one wall 31A of the region 31. This is due to the Coriolis acceleration caused by rotation of the rotor 30. The fuel may enter the combustion region 47 through the same opening 51 as the incoming air. However, at some point down the wall 31A of the compression region 31, at least one fuel delivery opening 95 is provided to allow fuel to enter the power region 38 and the combustion region 47. The fuel will attain a high velocity as it travels through the compression region 31, so the openings 95 and 51 can have devices to break the fuel flow into a spray or otherwise mix it with the air for combustion. The location, shape or size of the opening 95 may allow a fuel/air mixture to pass through which is of a different ratio than the total average fuel/air ratio traveling through the compression region 31.

Figure 5:
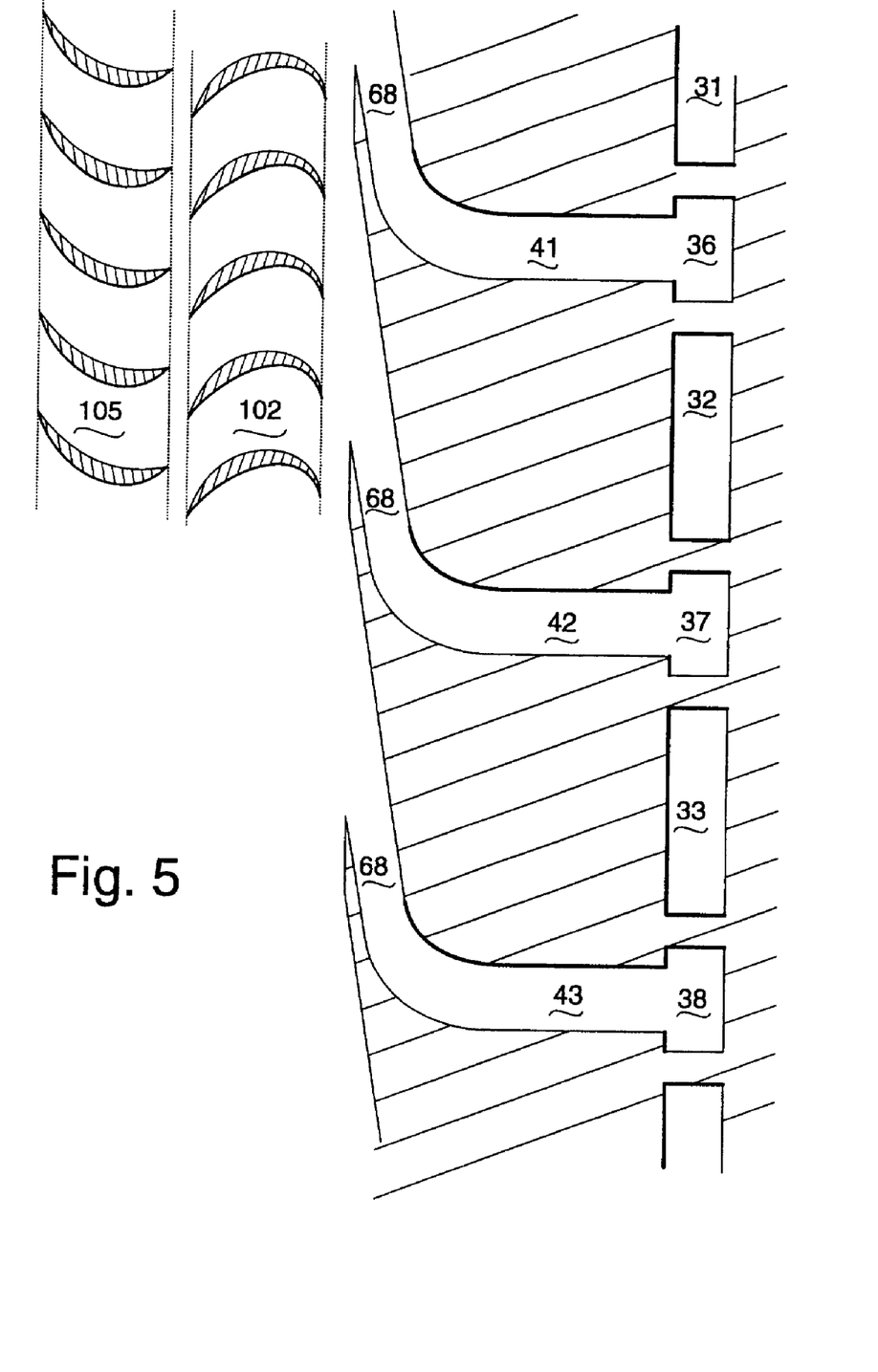
FIG. 5 is an unwrapped circular section through the nozzles and turbine section of the engine of FIGS. 2 and 3, showing the relationship of the nozzles, stator and turbine.

Referring now to FIGS. 3 and 5, after the high velocity exhaust gas has exited the outlet nozzle 68 it may be directed at a conventional turbine stage 101 to further utilize the energy in this high speed gas. The stator portion 102 is fixed to the housing 61 and is followed by the turbine portion 105 which is fixed to the rotor shaft 62. There may be one or more of these turbine stages. The nozzle exit may be pointed slightly towards the downstream turbine stage 101, which is beneficial in its operation. After the exhaust gas jet has passed through turbine stage 101, it exits the engine by flowing through duct 106 in housing 61. Some or all of the turbine stages may be attached to other shafts which are independent from the main rotor shaft 62.

Figure 6:
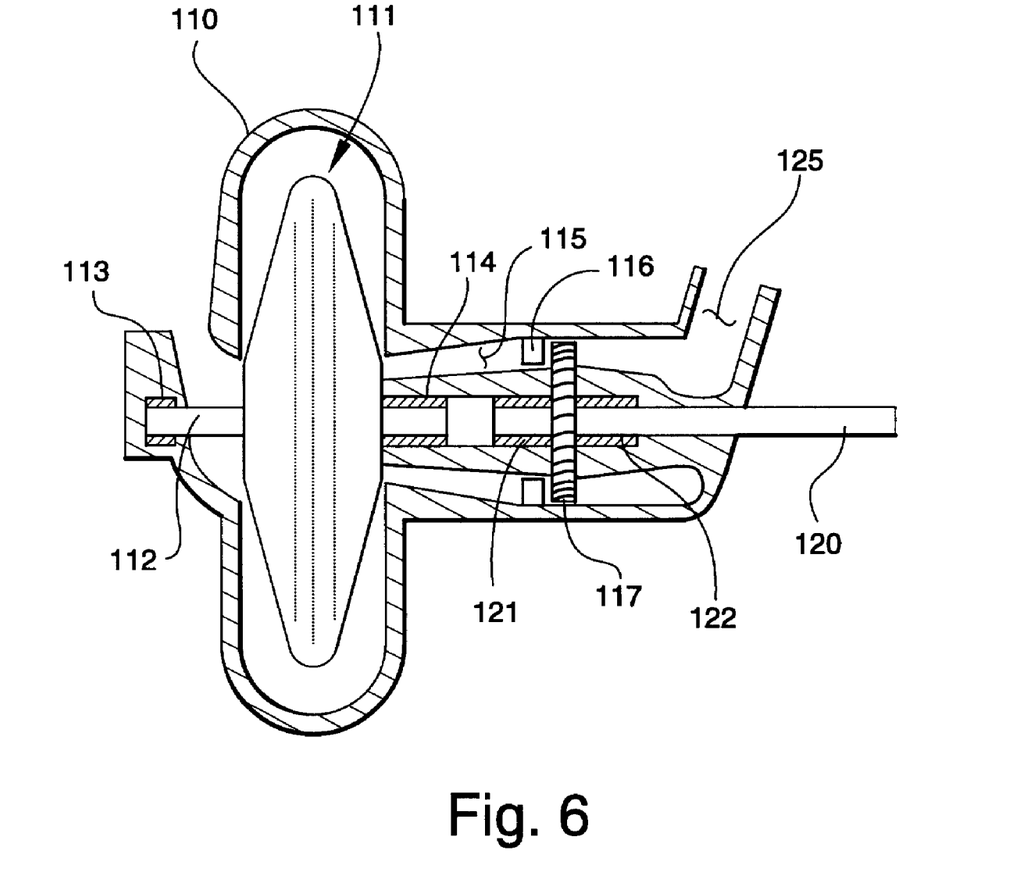
FIG. 6 is a longitudinal section through a complete engine according to a further embodiment of the invention, and showing the turbine section mounted on a shaft separate from the main rotor shaft.

In the embodiment of FIG. 6, an engine housing 110 contains a rotor 111 which is fixed to rotor shaft 112. The rotor shaft 112 is journaled in bearings 113 and 114. The high speed exhaust gas jet flows through housing duct 115 to the stator 116 and turbine 117. The turbine 117 is connected to shaft 120 which is journaled in bearings 121 and 122. The housing 110 has provision for the shaft 120 to pass through the engine exhaust duct 125, and deliver power to the required external device.

There are also elements to this engine that are not shown in the preceding figures, but are common practice within any engine design. These elements include gears to provide the proper ratio of rotor speed to desired engine output speed, bearing lubrication and cooling systems, air filters, fuel pumps, controls, ignition circuits and other usual engine parts. To enhance efficiency or power output of the engine, conventional compressors may be used to compress the inlet air and intercoolers may be present to cool this compressed air before it is delivered to the rotor inlet.

An internal combustion engine is described above. Various details of the invention may be changed without departing from its scope. Furthermore, the foregoing description of the preferred embodiment of the invention and the best mode of practicing the invention are provided for the purpose of illustration only and not for the purpose of limitation—the invention being defined by the claims.

I claim:

1. A rotary internal combustion engine comprising a housing within which is mounted for rotation at least one rotor, said rotor configured for rotation about an axis and including at least one flow conduit, said at least one flow conduit comprising:

(a) a compression region comprising an inlet proximate to the rotation axis of said rotor and extending radially towards a periphery of said rotor, wherein a mixture comprising air and fuel enters the flow conduit through said inlet and travels downstream through at least a portion of said compression region prior to combustion;

(b) a combustion region communicating with said compression region and proximate to the periphery of said rotor, said air/fuel mixture flowing from the compression region to the combustion region to undergo combustion in the combustion region; and (c) a power region communicating with said combustion region and comprising an outlet proximate to the rotation axis of said rotor, said power region extending from the periphery of said rotor to said outlet, and said air/fuel mixture exiting the flow conduit through said outlet after combustion; and (d) said compression region, combustion region, and power region of said flow conduit defining a substantially U-shaped flow path along which the air/fuel mixture travels during engine operation.

2. A rotary internal combustion engine according to claim 1, wherein the combined volume of the combustion region and the power region is substantially greater than the volume of the compression region.

3. A rotary internal combustion engine according to claim 1, wherein said rotor comprises at least two separate flow conduits.

4. A rotary internal combustion engine according to claim 1, wherein said rotor comprises at least two interconnected flow conduits having respective compression, combustion, and power regions, said flow conduits being interconnected such that at least one of the compression regions is configured to deliver the air/fuel mixture simultaneously to at least two of the combustion regions.

5. A rotary internal combustion engine according to claim 1, and comprising an inducer located at the inlet of said compression region.

6. A rotary internal combustion engine according to claim 1, and comprising a fuel injector located proximate to the inlet of said compression region to introduce fuel into the flow conduit.

7. A rotary internal combustion engine according to claim 1, and comprising a spark plug located proximate to the inlet of said compression region to ignite the air/fuel mixture.

8. A rotary internal combustion engine according to claim 1, wherein the outlet of said power region comprises an outlet nozzle through which the air/fuel mixture exits the flow conduit after combustion.

9. A rotary internal combustion engine according to claim 8, wherein said outlet nozzle is constructed such that the combusted air/fuel mixture exits the flow conduit as an exhaust jet, said exhaust jet having a velocity vector comprising a component vector at right angles to the rotation axis of the rotor.

10. A rotary internal combustion engine according to claim 9, and comprising a turbine arranged downstream of said outlet nozzle for being actuated by the combusted air/fuel mixture exiting the flow conduit.

11. A rotary internal combustion engine according to claim 10, and comprising an air duct extending from said outlet nozzle to said turbine.

12. A rotary internal combustion engine according to claim 10, wherein said turbine is operatively connected to a rotor shaft at the rotation axis of the rotor.

13. A rotary internal combustion engine according to claim 10, wherein said turbine comprises first and second portions, the first portion delivering power directly to the rotor shaft and the second portion delivering power to a second shaft.

14. A rotary internal combustion engine according to claim 1, and comprising a vacuum pump connected to an interior of the engine housing for maintaining air surrounding the rotor at a pressure below atmospheric pressure during engine operation.

15. A rotary internal combustion engine according to claim 1, wherein an exterior surface of the rotor is contoured to minimize aerodynamic drag.

16. A rotary internal combustion engine according to claim 15, wherein interior walls of the housing adjacent to the exterior surface of the rotor are contoured to minimize aerodynamic drag.

17. A rotary internal combustion engine according to claim 16, wherein the distance between the exterior surface of the rotor and the interior surface of the housing is at least two times the boundary layer thickness of the air between the rotor and the housing.

18. A rotary internal combustion engine according to claim 1, wherein said compression region of the flow conduit comprises means for diffusing the fuel into the air to enhance combustion.

19. A rotary internal combustion engine according to claim 1, wherein the engine housing defines an entrance port for directing incoming air to the inlet of said compression region.

20. A rotary internal combustion engine according to claim 1, wherein said compression region defines a fuel delivery opening between the inlet and said combustion region.

21. A rotary internal combustion engine according to claim 1, and comprising at least one seal located between the engine housing and the rotor to minimize air leakage back into an internal cavity defined by the housing.

22. A rotary internal combustion engine according to claim 21, and comprising at least one journal located adjacent to said at least one seal between the engine housing and rotor.

23. A rotary internal combustion engine according to claim 1, and wherein said engine housing defines an exhaust duct for exhausting air outwardly from said housing.

24. A rotor mounted for rotation within a housing of a rotary internal combustion engine, said rotor configured for rotation about an axis and including at least one flow conduit, said at least one flow conduit comprising:

(a) a compression region comprising an inlet proximate to the rotation axis of the rotor and extending radially towards a periphery of the rotor, wherein a mixture comprising air and fuel enters the flow conduit through said inlet and travels downstream through at least a portion of said compression region prior to combustion;

(b) a combustion region communicating with said compression region and proximate to the periphery of the rotor, said air/fuel mixture flowing from the compression region to the combustion region to undergo combustion in the combustion region; and (c) a power region communicating with said combustion region and comprising an outlet proximate to the rotation axis of the rotor, said power region extending from the periphery of the rotor to the outlet, and said air/fuel mixture exiting the flow conduit through said outlet after combustion; and (d) said compression region, combustion region, and power region of said flow conduit defining a substantially U-shaped flow path along which the air/fuel mixture travels during engine operation.

* * * * *